US008473463B1

(12) United States Patent
Wilk

(10) Patent No.: US 8,473,463 B1
(45) Date of Patent: Jun. 25, 2013

(54) METHOD OF AVOIDING DUPLICATE BACKUPS IN A COMPUTING SYSTEM

(75) Inventor: Tomasz Wilk, Longwood, FL (US)

(73) Assignee: Symantec Corporation, Mountain View, CA (US)

( * ) Notice: Subject to any disclaimer, the term of this patent is extended or adjusted under 35 U.S.C. 154(b) by 438 days.

(21) Appl. No.: 12/715,560

(22) Filed: Mar. 2, 2010

(51) Int. Cl.
*G06F 7/04* (2006.01)
*G06F 17/30* (2006.01)

(52) U.S. Cl.
USPC .............................. 707/647; 707/649; 707/653

(58) Field of Classification Search
USPC .............. 707/999.003, 999.01, 999.204, 649,
707/647, 653, 999.202, 999.203
See application file for complete search history.

(56) References Cited

U.S. PATENT DOCUMENTS

| | | | |
|---|---|---|---|
| 5,276,860 A | 1/1994 | Fortier et al. | |
| 5,535,381 A | 7/1996 | Kopper | |
| 5,555,371 A | 9/1996 | Duyanovich et al. | |
| 5,559,991 A | 9/1996 | Kanfi | |
| 5,561,421 A | 10/1996 | Smith | |
| 5,778,395 A * | 7/1998 | Whiting et al. | 1/1 |
| 5,835,953 A | 11/1998 | Ohran | |
| 5,990,810 A | 11/1999 | Williams | |
| 5,991,542 A | 11/1999 | Han et al. | |
| 6,014,676 A | 1/2000 | McClain | |
| 6,029,168 A | 2/2000 | Frey | |
| 6,085,298 A | 7/2000 | Ohran | |
| 6,101,585 A | 8/2000 | Brown et al. | |
| 6,141,784 A | 10/2000 | Davis | |
| 6,360,330 B1 | 3/2002 | Mutalik et al. | |
| 6,389,433 B1 | 5/2002 | Bolosky et al. | |
| 6,513,051 B1 * | 1/2003 | Bolosky et al. | 1/1 |
| 6,542,962 B2 | 4/2003 | Kodama et al. | |
| 6,640,278 B1 | 10/2003 | Nolan et al. | |
| 6,665,815 B1 | 12/2003 | Goldstein et al. | |

(Continued)

FOREIGN PATENT DOCUMENTS

EP 838758 4/1998

OTHER PUBLICATIONS

"Windows DDK Glossary," http://msdn.microsoft.com/library/default.asp?url=/library/en-us/gloss/hh- /gloss/glossary.sub.--628b1dfc-c8f0-4143-a4ef-0dddae24be4b.xml.asp, (3 pages).

(Continued)

*Primary Examiner* — Bruce Moser
(74) *Attorney, Agent, or Firm* — Rory D. Rankin; Meyertons, Hood, Kivlin, Kowert & Goetzel, P.C.

(57) ABSTRACT

A system and method for avoiding duplicate backups of data in a volume backup image. A cluster of nodes is coupled to a data storage medium configured to store data corresponding to a shared volume. A node receives a request for the backup of the shared volume. In response to this request, the node queries all other nodes in the cluster for identification of a subset of the shared volume data that should be excluded from the backup. The identified subset of the data may correspond to at least a file under control of a database application or other particular application. It may be known that this identified subset of the data will be backed up by a subsequent agent-based backup operation after the volume backup. In response to receiving all query responses, the node initiates a backup corresponding to the data in the shared volume excluding the identified subset of the data.

20 Claims, 7 Drawing Sheets

U.S. PATENT DOCUMENTS

| | | | |
|---|---|---|---|
| 6,714,952 B2 | 3/2004 | Dunham et al. | |
| 6,785,786 B1 | 8/2004 | Gold et al. | |
| 6,829,688 B2 | 12/2004 | Grubbs et al. | |
| 6,847,983 B2 | 1/2005 | Somalwar et al. | |
| 6,865,655 B1 | 3/2005 | Andersen | |
| 6,880,051 B2 | 4/2005 | Timpanaro-Perrotta | |
| 6,910,112 B2 | 6/2005 | Berkowitz et al. | |
| 6,920,537 B2 | 7/2005 | Ofek et al. | |
| 6,938,135 B1 | 8/2005 | Kekre et al. | |
| 6,976,039 B2 | 12/2005 | Chefalas et al. | |
| 6,983,365 B1 | 1/2006 | Douceur et al. | |
| 7,055,008 B2 | 5/2006 | Niles | |
| 7,136,976 B2 | 11/2006 | Saika | |
| 7,146,429 B2 | 12/2006 | Michel | |
| 7,200,604 B2 | 4/2007 | Forman et al. | |
| 7,213,158 B2 | 5/2007 | Bantz et al. | |
| 7,257,104 B2 | 8/2007 | Shitama | |
| 7,257,643 B2 | 8/2007 | Mathew | |
| 7,310,644 B2 | 12/2007 | Adya et al. | |
| 7,318,072 B2 | 1/2008 | Margolus | |
| 7,359,920 B1 | 4/2008 | Rybicki et al. | |
| 7,389,394 B1 | 6/2008 | Karr | |
| 7,401,194 B2 | 7/2008 | Jewell | |
| 7,409,523 B2 | 8/2008 | Pudipeddi | |
| 7,424,514 B2 | 9/2008 | Noble et al. | |
| 7,454,592 B1 | 11/2008 | Shah | |
| 7,478,113 B1 | 1/2009 | De Spiegeleer | |
| 7,529,785 B1* | 5/2009 | Spertus et al. | 1/1 |
| 2001/0045962 A1 | 11/2001 | Lee | |
| 2002/0107877 A1 | 8/2002 | Whiting et al. | |
| 2003/0163495 A1 | 8/2003 | Lanzatella et al. | |
| 2003/0177149 A1 | 9/2003 | Coombs | |
| 2004/0044707 A1 | 3/2004 | Richard | |
| 2004/0143731 A1 | 7/2004 | Audebert et al. | |
| 2004/0268068 A1 | 12/2004 | Curran et al. | |
| 2005/0027766 A1 | 2/2005 | Ben | |
| 2005/0131903 A1* | 6/2005 | Margolus et al. | 707/10 |
| 2005/0198328 A1 | 9/2005 | Lee et al. | |
| 2005/0204108 A1 | 9/2005 | Ofek | |
| 2005/0216788 A1 | 9/2005 | Mani-Meitav et al. | |
| 2005/0216813 A1 | 9/2005 | Cutts et al. | |
| 2006/0026219 A1 | 2/2006 | Orenstein et al. | |
| 2006/0089954 A1* | 4/2006 | Anschutz | 707/202 |
| 2006/0184587 A1 | 8/2006 | Federwisch et al. | |
| 2006/0271540 A1 | 11/2006 | Williams | |
| 2007/0192548 A1 | 8/2007 | Williams | |
| 2007/0198659 A1 | 8/2007 | Lam | |
| 2007/0250674 A1 | 10/2007 | Fineberg et al. | |
| 2008/0005141 A1 | 1/2008 | Zheng et al. | |
| 2008/0126431 A1* | 5/2008 | Walliser et al. | 707/200 |
| 2008/0133561 A1 | 6/2008 | Dubnicki et al. | |
| 2008/0154989 A1 | 6/2008 | Arman | |
| 2008/0228939 A1 | 9/2008 | Samuels et al. | |
| 2008/0243769 A1 | 10/2008 | Arbour et al. | |
| 2008/0243953 A1 | 10/2008 | Wu et al. | |
| 2008/0244204 A1 | 10/2008 | Cremelie et al. | |
| 2010/0083003 A1 | 4/2010 | Spackman | |
| 2010/0250896 A1 | 9/2010 | Matze | |
| 2010/0257403 A1 | 10/2010 | Virk et al. | |
| 2010/0274982 A1 | 10/2010 | Mehr et al. | |
| 2010/0332452 A1 | 12/2010 | Hsu et al. | |

OTHER PUBLICATIONS

"Repliweb R-1 User Guide—Version 3.1," RepliWeb, Inc., 2002, (27 pages).

"FilesX Xchange RestoreTM for Microsoft Exchange Server," FilesX, Inc., Aug. 2003, (2 pages).

"Instructor Articles," Veritas Education, pp. 1-7, Apr. 2003.

"EMC TimeFinder Family," EMC Corporation, 8 pages, Oct. 2004.

"EMC TimeFinder Local Replication," EMC Corporation, 2 pages, Oct. 2004.

"Storage Area Networking-High-Speed Data Sharing Among Multiple Computer Platforms", Tivoli Systems, Inc., Copyright 2000. ftp://ftp.software.ibm.com/software/tivoli/whitepapers/san_datasharing_wp.pdf, (2000), 4 pages.

"Storage Management—Best Practices", Copyright 2001, IBM Corp., ftp://ftp.software.ibm.com/software/tivoli/whitepapers/wp-storage-bp.pdf, (2001), 11 pages.

Amiri, Khalil S., "Scalable and manageable storage systems", Ph.D. Thesis, Dept. of Electrical and Computer Engineering, Carnegie Mellon University, Pittsburgh, PA, http://www.pdl.cmu.edu/PDL-FTP/NASD/amiri_thesis.pdf, (Dec. 2000), i-241 pgs.

Wylie, Jay J., et al., "Selecting the Right Data Distribution Scheme for a Survivable Storage System", Research Paper, School of Computer Science, Carnegie Mellon University, Pittsburgh, PA, http://www.pdl.cmu.edu/PDL-FTP/Storage/CMU-CS-01-120.pdf, May 2001), pp. 1-21.

U.S. Appl. No. 11/404,105 entitled Routing, filed Apr. 13, 2006.

U.S. Appl. No. 11/403,379 entitled Parallel Backup, filed Apr. 13, 2006.

U.S. Appl. No. 11/641,389, filed Dec. 18, 2006, entitled "Single Instance Storage".

* cited by examiner

METHOD OF AVOIDING DUPLICATE BACKUPS IN A COMPUTING SYSTEM

BACKGROUND OF THE INVENTION

1. Field of the Invention

This invention relates to the field of computer processing and, more particularly, to avoiding duplicate backups of data in a volume backup image.

2. Description of the Related Art

As computer memory storage and data bandwidth increase, so does the amount and complexity of data that businesses manage. In order to protect such data, the contents of information servers and end-user systems may be backed up to a data storage subsystem. In many cases a backup agent on each client is configured to convey data files to a backup server according to a variety of schedules, policies, etc. The data storage subsystem may include a backup system configured by an information technology (IT) administrator.

In addition to desiring an efficient data backup system, a company or workgroup may require high availability of services provided by the computing system. In order to increase availability, clusters of multi-processor nodes may be coupled via a network. With cluster computing, a redundant node or other node in the cluster provides service when a first node fails. However, one issue that arises with clustered computing that utilizes shared storage is that nodes, and virtual machines (VMs) within nodes, are dependent on disk resources. In the event a physical disk resource is moved from one node to another, fast live migration of applications and/or VMs may not possible. At the end of the migration the volume must be un-mounted and then mounted again, both of which are time consuming tasks. Without fast migration, one of the benefits of clustered computing is reduced. Another issue that may arise is the VM and all dependent resources corresponding to a same logical unit number (LUN) form a dependent group that can only be moved or failed over as a complete unit. When moving or performing a failover for one VM or LUN, a move or failover is performed for all of the VMs and resources, such as the volume, in the group.

One solution to the issues mentioned above is a cluster shared volume that is simultaneously visible and accessible to all cluster nodes. Such a volume may be a standard cluster disk containing an NTFS volume that is made directly accessible for read and write operations by all nodes within the cluster. This gives a VM mobility throughout the cluster, as any node can be an owner. Fast migration may be possible with such a volume. However, during a volume-level backup operation, some data may be backed up twice. For example, customers may initially perform a volume-level backup to obtain full volume flat file backups. At a later time, customers may perform an agent-based backup operation of particular data used by a given node. The agent-based backup temporarily disables applications, such as database applications, on the corresponding node and backs up individual files corresponding to the applications.

Because a node performing a volume level backup has no knowledge of which portions of a volume are used by particular applications on another node, a volume level backup will simply perform a backup of the entire volume. Subsequently, when the agent level backup is performed, the agent level backup will backup data which was also backed up during the volume level backup.

In view of the above, methods and mechanisms for avoiding duplicate backups of data in a volume backup image are desired.

SUMMARY OF THE INVENTION

Systems and methods for avoiding duplicate backups of data in a volume backup image are contemplated. In one embodiment, a computer system includes a cluster comprising at least two nodes coupled to a data storage medium. The data storage medium is configured to store data corresponding to a shared volume, which is shared by the nodes in the cluster. Each of the cluster nodes comprises a snapshot service, such as Volume Shadow Copy Service (VSS), for use in creating a copy of data stored in the shared volume. A predetermined controlling node within the cluster receives a request for the backup of the shared volume. In response to this request, the controlling node generates a query to each other node within the cluster. In response to receiving the query, each of the other nodes identifies a subset of the data stored in the shared volume that should be excluded from the backup. In one embodiment, the identified subset of the data corresponds to data stored on the volume which is utilized by a particular application. It may be known that this identified subset of the data will be backed up by a subsequent agent-based backup operation shortly after the current backup. Each of the other nodes may utilize components of the VSS to perform the identification and send the query responses to the controlling node. In response to receiving all query responses, the controlling node initiates a backup of the shared volume. The backup operation corresponds to the data in the shared volume excluding the identified subset of the data.

These and other embodiments will be appreciated upon reference to the following description and accompanying drawings.

Figure 1:
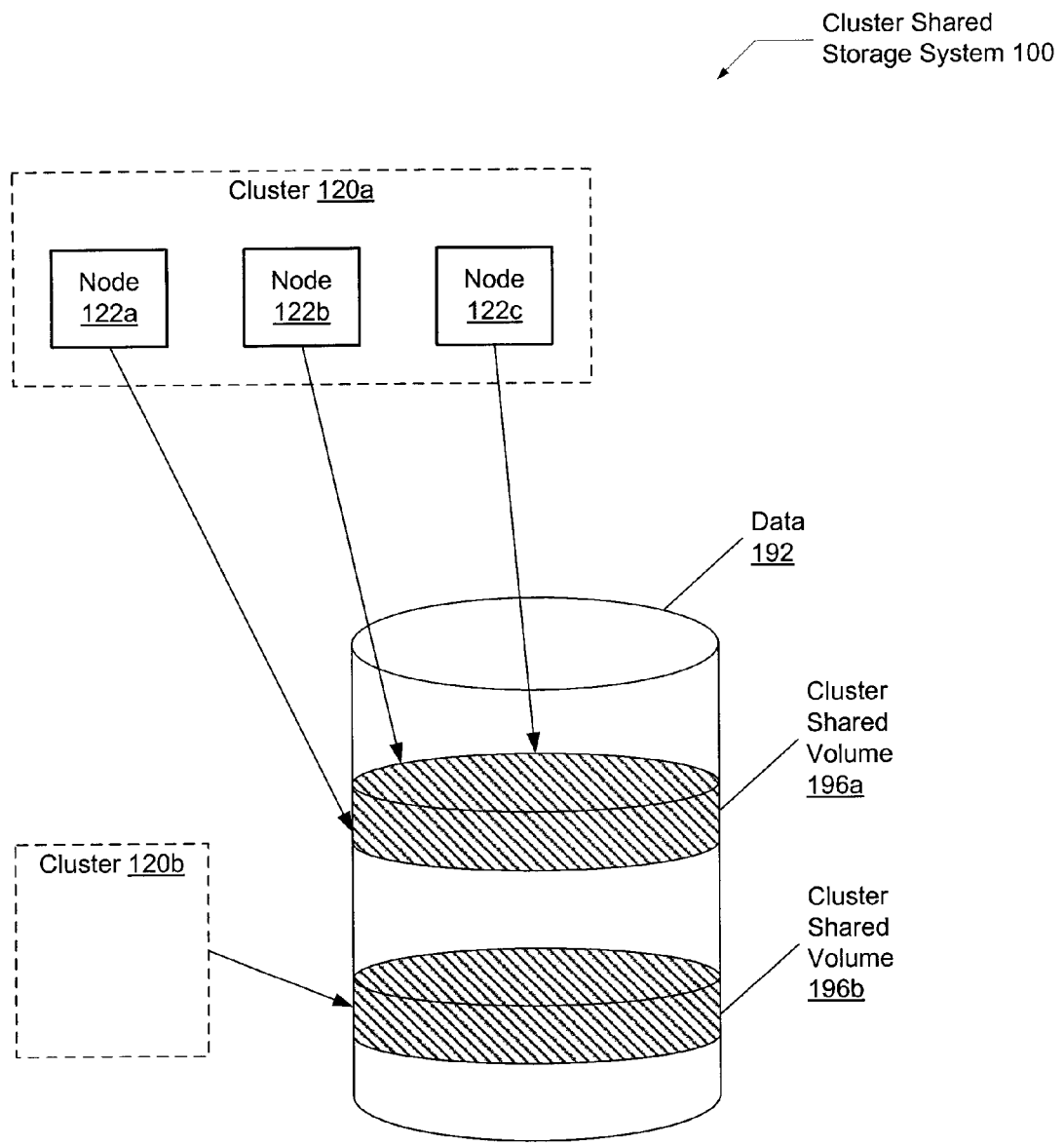
FIG. 1 is a generalized block diagram illustrating one embodiment of a cluster shared storage system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention may be practiced without these specific details. In some instances, well-known circuits, structures, signals, computer program instruction, and techniques have not been shown in detail to avoid obscuring the present invention.

Referring to FIG. 1, a generalized block diagram of one embodiment of a cluster shared storage system 100 is shown. Generally speaking, a cluster, such as cluster 120a and cluster 120b, is a group of linked nodes. The nodes, such as node 122a, node 122b, and node 122c, are typically connected to one another through fast local area networks (LANs), which are not shown to simplify the illustration. Each of clusters 120a and 120b may include any number of nodes. Node 122a, node 122b, and node 122c are shown for illustrative purposes, but cluster 120a is not limited to linking three nodes. Each node may be a single computer or a multi-processor system. Each processor within a node may host one or more virtual machines, wherein each virtual machine is configured to execute multiple software applications. Cluster 120a may share a storage resource, such as cluster shared volume 196a on data 192. In one embodiment, the data 192 may be stored on one or more hard disks. In one embodiment, the one or more hard disks may be arranged into logical, redundant storage containers or RAID arrays (redundant arrays of inexpensive/independent disks). Each of nodes 122a-122c may share the data storage comprised within cluster shared volume 196a.

A cluster, such as cluster 120a, may be deployed to improve performance and/or availability over that of a single computer or a single node. A cluster takes advantage of the parallel processing power of the included nodes to provide high performance and/or high availability. In order to ensure constant access to service applications, cluster 120a may maintain redundant nodes that can act as a backup node in the event of failure of another node. The minimum number of nodes in a high availability (HA) cluster is two—one active and one redundant—though typical HA clusters use more nodes. HA clusters may ensure round-the-clock access to computational power. This feature may be especially important in business, where data processing is usually time-sensitive.

In order to further take advantage of the high availability described above, it is desired that each of the nodes 122a-122c have no dependency on a disk resource storing data 192. In such a case, each of the applications, or alternatively, each of the VMs, running on a node may freely move to and from any node in cluster 120a. Such a move may result from a failover operation. Typically, all dependent resources with a same logical unit number (LUN) are not able to independently move. Therefore, during failover, each resource within a dependent group is moved. A dependence on a disk resource includes a disk or a volume within a disk to be dismounted, moved, and remounted on a new cluster node.

In contrast to a typical dependence on a standard cluster disk as described above, cluster shared volume 196a may be a New Technology File System (NTFS) volume on a standard cluster disk that is made accessible for read and write operations by all nodes 122a-122c within the cluster 120a. Cluster shared volume 196a may stay mounted and visible to all cluster nodes at all times providing a more efficient failover mechanism. Similarly, cluster shared volume 196b may be accessible for read and write operations by all nodes within the cluster 120b. Cluster shared volume 196b may not be unmounted and remounted during failover as is the case with a standard cluster disk. Cluster shared volumes 196a-196b may enable fast live migration since the physical disk resource is not moved between nodes during failover. One example of such characteristics includes the live migration and the cluster shared volume features in the server operating system Windows Server® 2008 R2.

Customers may wish to backup cluster shared volume 196a for multiple reasons such as added protection, a later system deployment for the setup of many computers, or otherwise. When backing up a volume, such as cluster shared volume 196a, customers may elect to use an initial volume-level backup followed by an agent-based backup. A volume-level backup operation may provide a full volume flat file image backup file. This volume image backup file may be created by performing a complete sector-by-sector, or alternatively, a byte-by-byte, copy of the data on a storage medium storing cluster shared volume 196a. This copy thereby replicates the structure and contents of cluster shared volume 196a. The state of the data stored on disk at one instant in time may be referred to as a snapshot or a shadow copy. The shadow copy may exist side by side with the live volume and contain copies of all files on the volume available as a separate device. An application that attempts to copy a full volume image also handles issues such as opened files and minimizing service interruption. A shadow copy service may be provided by the operating system. This service may be used to provide the ability to capture a state of a disk or a volume on a disk at one instant in time. One example of such a service is the Volume Shadow Copy Service (VSS). VSS is a service which provides backup infrastructure for Microsoft® Windows® operating systems, and is a mechanism for creating consistent point-in-time copies of data known as shadow copies.

An agent-based backup operation mentioned above that follows a volume-level backup operation may also use the snapshot service within an operating system. This snapshot service may be used to temporarily halt applications from running or performing read and write transactions before allowing the backup of selected files. A backup agent may be loaded onto each client to convey data files to a backup server according to a variety of schedules, policies, etc. A backup server may include or be further coupled to one or more disk storage devices, tape drives, or other backup media. An information technology (IT) administrator may create the schedule for the backup agent to convey data files to a backup server. In one embodiment, an agent-based backup operation may occur shortly after a volume-level backup operation. For example, a volume-level backup operation may occur on a weekly basis, whereas an agent-based backup operation may occur on a daily basis.

Having an agent-based backup operation closely follow a volume-level backup operation may lead to duplicate backup copies of data in the volume image file. For example, node 122b in cluster 120a may run a database application. This database application may utilize particular files stored on cluster shared volume 196a. These particular files may be backed up by an agent-based backup operation on a daily basis. A volume-level backup operation may be performed earlier in the day and backup all data on cluster shared volume 196a including these particular files. Later, during the scheduled time for the agent-based backup operation, these particular files are backed up a second time. A duplicate copy of these particular files is created by the agent-based backup operation. Duplicate copies of any files in a backup storage increase the storage capacity, the access time, and the network bandwidth used to protect machines.

Figure 2:
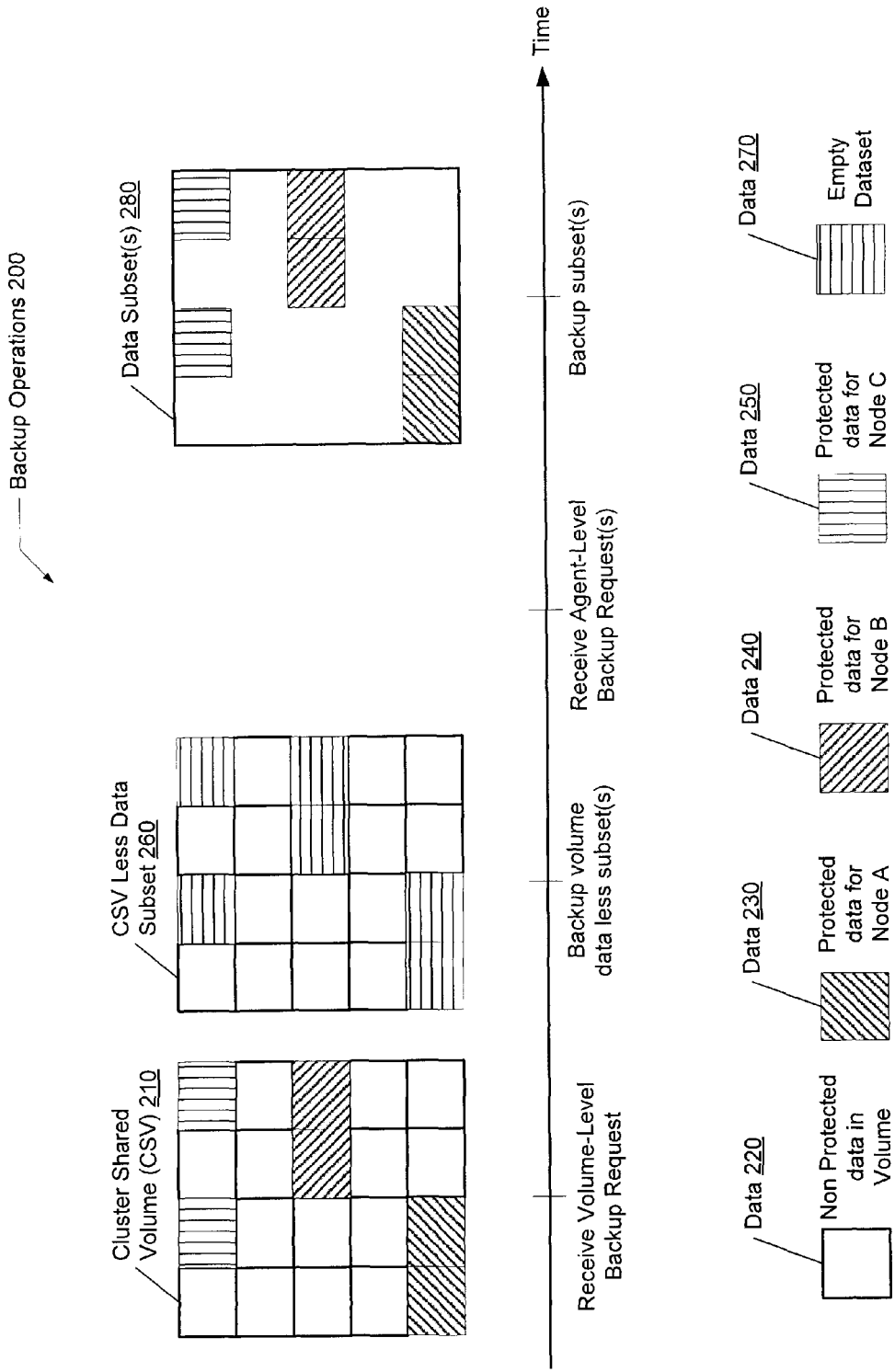
FIG. 2 is a generalized block diagram illustrating one embodiment of a volume-level backup operation.

Turning now to FIG. 2, a generalized block diagram of one embodiment of a volume-level backup operation 200 is shown. A representation of the data stored on a cluster shared volume (CSV), such as cluster shared volume 196a in FIG. 1, is shown with CSV 210. Generally speaking, the data 210 includes non-write protected data 220 that may not be associated with an agent-based backup operation. Each node of a cluster may have associated write-protected data. In the example shown in FIG. 1, a cluster may comprise three nodes. For sake of this example, nodes 122a-122c may be renamed to nodes A-C. Nodes A-C may have corresponding write-protected data stored on the volume, such as data 230, data 240, and data 250.

The data in CSV 210 may be simultaneously visible to all cluster nodes, such as nodes A-C. If each of the nodes within a cluster is allowed to modify a file table (e.g., the NTFS Master File Table) without any restrictions, then data corruption would occur. In order to eliminate this problem, one of the nodes within the cluster may be designated as a controlling node for the cluster. The controlling node may be responsible for all NTFS metadata changes. Some examples of NTFS metadata changes include renaming files, creating new files, and deleting files. These types of transactions may be routed over a private network to the controlling node. The controlling node may then serialize these transactions and perform corresponding changes to the underlying NTFS Master File Table. Read and write transactions may not alter file system metadata. These read and write transactions may be sent directly to the CSV 210 through a storage interconnect fabric, in one embodiment. The sending of these read and write transactions may bypass the local VSS and NTFS file system processing. A write transaction to a file that does not change the file size may become efficient and fast due to this bypass. One example of this feature is Direct I/O, which is a feature of a file system whereby file read and write transactions bypass the operating system read and write caches. Generally speaking, Direct I/O is a failover clustering feature. Running applications are typically not aware of it and need not do anything special to take advantage of DirectI/O. Applications that operate on large fixed size files, such as Hyper-V and SQL, may particularly benefit from DirectI/O. For these types of applications, only a small portion of the traffic they generate alters filesystem metadata. Consequently, a majority of the data traffic they generate can follow a Direct I/O path.

Continuing with the above example, node A shares CSV 210 with node B and node C. Node A may be designated as the controlling node and therefore node A may receive a volume-level backup request. Node A may be responsible for performing a snapshot of CSV 210, but without the write-protected data subsets of nodes A-C, such as data 230, data 240, and data 250, respectively. CSV 260 may represent the data stored in CSV 210 less the write-protected data subsets. Data 270 illustrates the lack of data being backed up in the locations in the volume corresponding to the write-protected data subsets 230-250. The steps involved to exclude the write-protected data subsets are described further below.

Following the backup of CSV 260 described above, at later times, each of the nodes A-C may utilize a backup agent-based operation to backup their respective write-protected data subsets. Data subsets 280 illustrate the backup of these write-protected data subsets 230-250. The combination of the data in CSV 260 and the data in data subsets 280 yield a backup of all the volume data in CSV 210 without duplicate copies. Both the volume-level backup request and the agent-based backup operations are well known to those skilled in the art. What is appreciated is the discovery of the write-protected data subsets 230-250 and excluding these data subsets from the initial volume-level backup operation. Therefore, the subsequent agent-based backup operations do not create duplicate copies of files in a backup.

Figure 3:
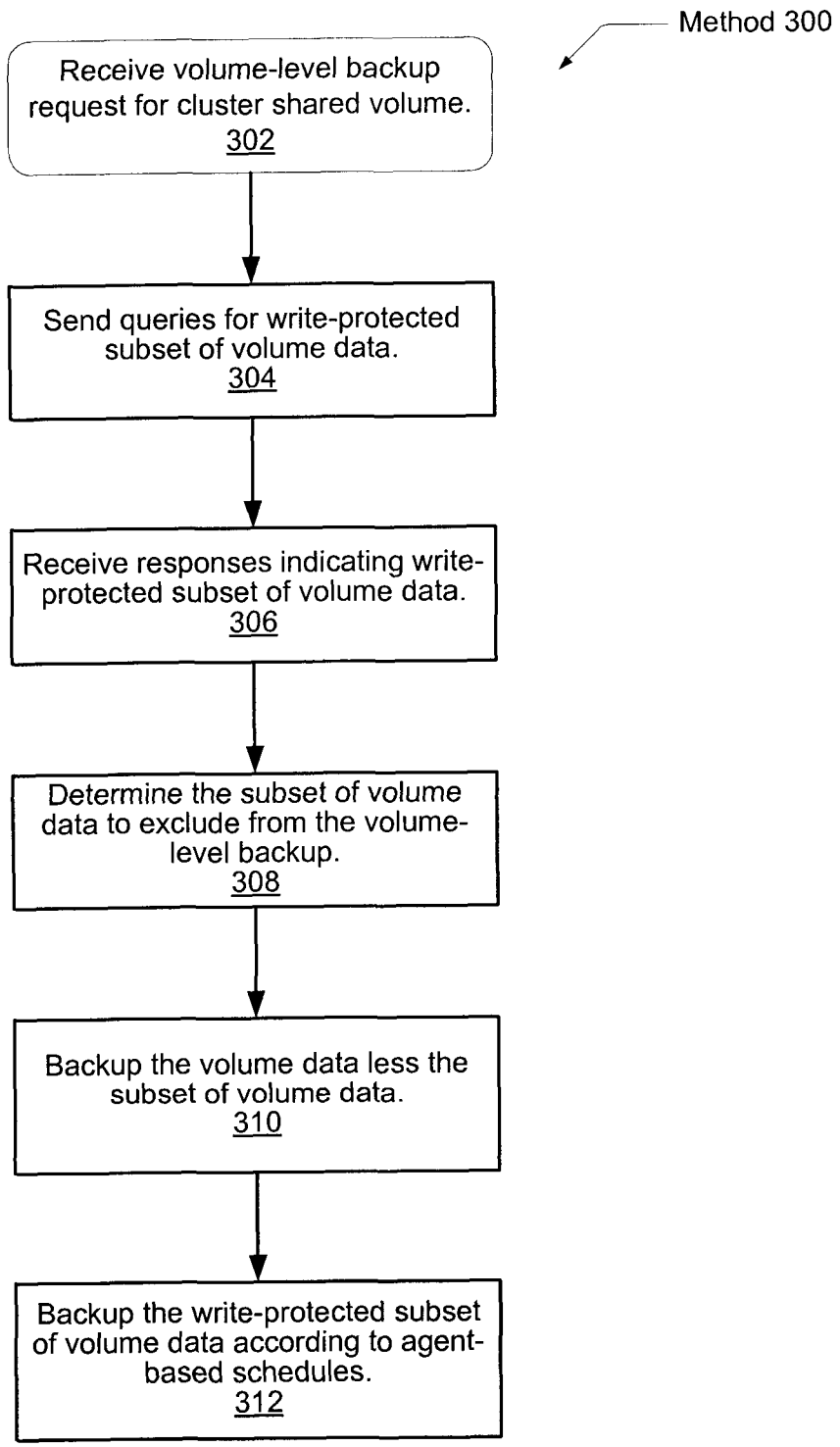
FIG. 3 is a flow diagram illustrating one embodiment of a method for avoiding duplicate copies in a volume-level backup operation.

Referring to FIG. 3, one embodiment of a method 300 for avoiding duplicate copies in a volume-level backup operation is shown. The components embodied in the cluster shared storage system described above may generally operate in accordance with method 300. For purposes of discussion, the steps in this embodiment are shown in sequential order. However, some steps may occur in a different order than shown, some steps may be performed concurrently, some steps may be combined with other steps, and some steps may be absent in another embodiment.

In block 302, a volume-level backup request for a cluster shared volume is received. In one embodiment, a predetermined controlling node within the cluster receives the request. However, it is noted that it is not guaranteed that a controlling node will be a node on which a backup job is run. If the controlling node is located somewhere else, it will be moved to the local node. The controlling node may determine corresponding write-protected data subsets within itself. However, the controlling node may not be able to identify write-protected data subsets in other nodes. For example, referring again to FIG. 2, node A may be a controlling node for a cluster comprising nodes A-C. In one example, this cluster may be cluster 120a in FIG. 1. Each of nodes A-C may comprise one or more applications, such as database applications, that store write-protected data subsets stored in CSV 196a shown in FIG. 1. CSV 210 in FIG. 2 may show a representation of the volume data in CSV 196a including the write-protected data subsets. Data subsets 230-250 in FIG. 2 may show these corresponding write-protected data subsets. A frequently scheduled agent-based backup operation may be associated with each of these write-protected data subsets. Node A may determine its own write-protected data subset 230. However, node A may not be aware of the corresponding data subsets 240-250 for nodes B-C. Although node A is responsible for all NTFS metadata changes, node A may not have sufficient information to identify data subsets 240-250.

In block 304, the controlling node, such as node A, may send queries to the other nodes within the cluster for identification of write-protected data subsets. Each node may communicate with corresponding applications to identify corresponding write-protected data subsets. Once a node receives a response from each application that the node queried, the node sends its complete response to the controlling node. In one embodiment, the identification within a response may include corresponding metadata for the write-protected data subsets. In another embodiment, the identification within a response may include corresponding metadata for data subsets associated with particular applications. This data subset may include both data that is associated with an agent-based backup operation and data that are not associated with an agent-based backup operation.

In one embodiment, each node packages its complete response according to a protocol before sending the response to the controlling node. Further details of this process are described later. In block 306, the controlling node receives the complete responses from each node. In block 308, the controlling node may combine the responses from the other nodes with its identification of its own write-protected data subsets. In another embodiment, the controlling node may keep the responses separate from one another and from its own identified write-protected data subsets. The controlling node may inspect the separate response separately. In one embodiment, the responses from the other nodes only contain identification of write-protected data subsets. In another embodiment, the responses from other nodes contain identification of data subsets corresponding to particular applications. In this embodiment, the controlling node inspects the responses and determines which data subsets within the responses should be excluded from a volume-level backup.

For example, the controlling node may inspect fields within corresponding metadata to perform this determination. The identification of the write-protected data subsets may include addresses of locations within the CSV where the data subsets are stored. After the determination performed on the responses from other nodes, the controlling node, such as node A, may have identified data subsets 240-250 shown in FIG. 2.

In block 310, the volume-level backup operation continues. The data stored in the CSV less the identified data subsets may be backed up. Referring again to FIG. 2, the CSV less data subset 260 may illustrate the data stored in the volume that is backed up at this time. This backup may not be a full volume backup if write-protected data subsets are identified. In block 312, backup operations of the write-protected subset of volume data according to agent-based schedules may be performed. Any data excluded from the earlier volume-level backup should be backed up by one of these agent-based backup operations. At the completion of the last scheduled agent-based backup operation, a full volume backup should be completed with no duplicate copies of data.

Figure 4:
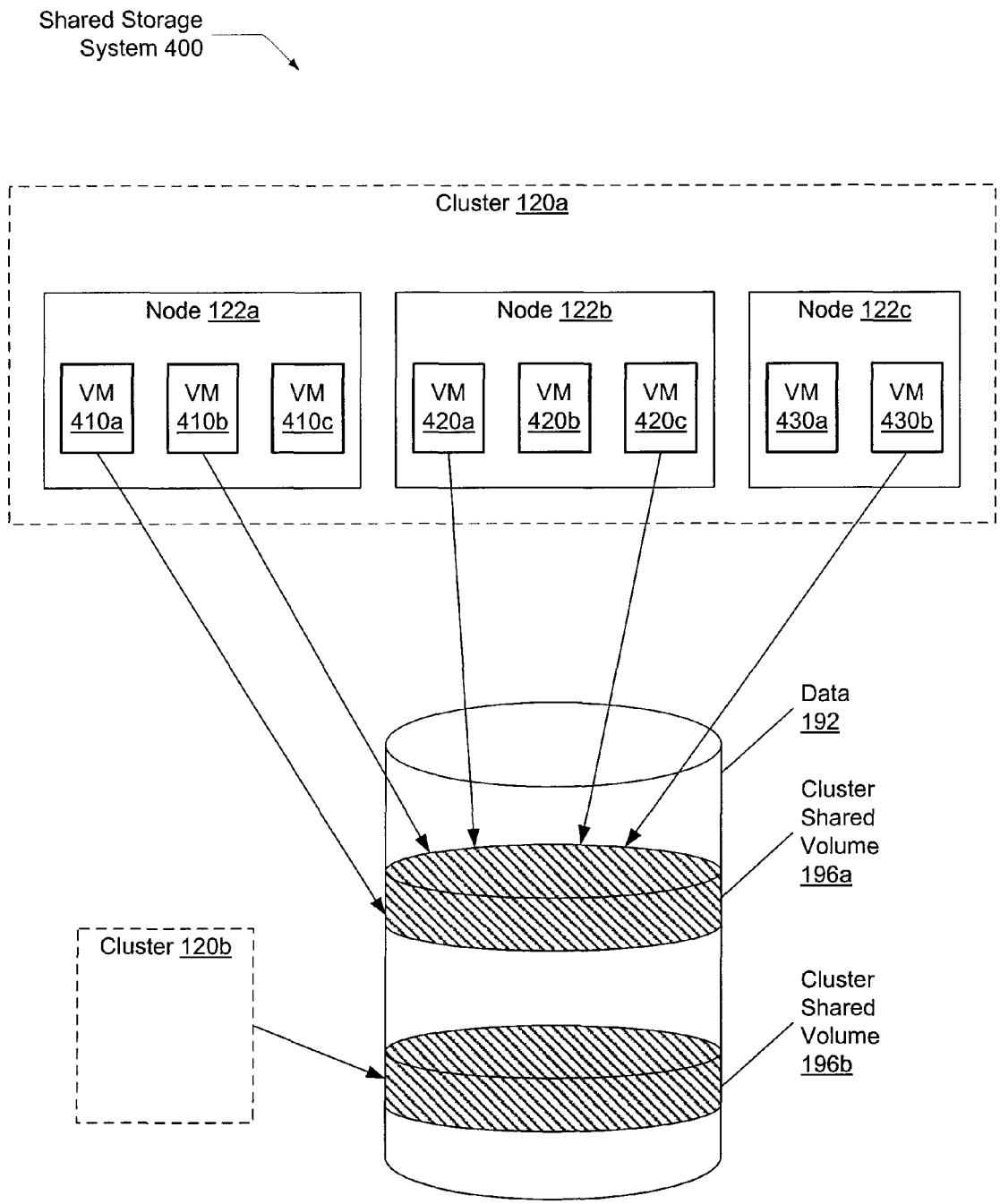
FIG. 4 illustrates another embodiment of a cluster shared storage system.

Referring to FIG. 4, a generalized block diagram of another embodiment of a cluster shared storage system 400 is shown. The same system components found in cluster shared storage 100 of FIG. 1 are numbered identically. Each of nodes 122a-122c may comprise one or more virtual machines (VMs). For example, node 122a comprises VM 410a, VM 410b, and VM 410c. Similarly, node 122b comprises VM 420a, VM 420b, and 420c, and node 122c comprises VM 430a and VM 430b. As is well known to those skilled in the art, virtualization may be used in desktops and servers to fully or partially decouple software, such as an OS, from a system's hardware. Virtualization may provide an end-user with an illusion of multiple OSes running on a same machine each having its own resources.

The system's hardware in each processing unit of a node may include typical computer hardware such as one or more processors, each with one or more processing cores, a memory hierarchy with different levels of caches, logic for system bus management or packet processing, interfaces for peripherals, and so forth. In one embodiment, a binary translation technique may utilize a host architecture approach that installs and runs a virtualization layer, such as a virtual machine monitor, as an application on top of an OS, such as a guest OS. This approach may translate kernel code to replace non-virtualizable instructions, which may be a part of an x86 architecture, with new sequences of instructions that have the intended effect on virtual hardware.

In another embodiment, virtualization may utilize a combination of hyper calls and direct execution techniques. This virtualization approach utilizes a hypervisor architecture approach that installs a virtualization layer, such as a hypervisor, directly on the hardware of a system. A hypervisor is a type of virtual machine monitor (VMM) that runs directly on hardware, rather than on top of an OS. A hypervisor may provide each virtual machine with all the services of the physical system, including virtual basic-input-output-software (BIOS), virtual peripheral devices, and virtualized memory management. Hypervisor based virtualization solutions include Xen, VMware ESX Server and Microsoft's Hyper-V technology.

Since a hypervisor has direct access to the hardware resources rather than going through an OS, a hypervisor may be more efficient than a hosted architecture. The use of a hypervisor may include modifying the kernel of a guest OS to replace non-virtualizable instructions, which may be a part of an x86 architecture, with hypercalls that communicate directly with the hypervisor. The hypervisor may also provide hypercall interfaces for other critical kernel operations such as memory management, interrupt handling, and time keeping.

Each VM is capable of executing one or more software applications. A typical high availability (HA) cluster may utilize HA virtual machines (VMs) to provide high-availability for applications running on the VMs. As already discussed, in the event of a physical server or computer failure, affected virtual machines may be automatically restarted on other servers with spare capacity. Therefore, unplanned downtime may be minimized.

As discussed earlier, typically, all dependent resources with a same logical unit number (LUN) are not able to independently move. Therefore, during failover, each resource within a dependent group is moved. A dependence on a disk resource includes a disk or a volume within a disk to be dismounted, moved, and remounted on a new cluster node. If additional VMs are created on a same cluster, each additional VM uses a separate LUN to store corresponding data to a separate volume. Otherwise, each additional VM is unable to move independently during failover. The requirement to create separate LUNs creates storage management challenges, as hundreds of VMs would use hundreds of LUNs. These described problems may be solved with the use of the earlier described NTFS volume on a standard cluster disk that is made accessible for read and write operations by all nodes within a cluster. One example, again, is the fast live migration.

Using the described CSV 196a, one or more VMs within each node 122a, 122b, and 122c within cluster 120a may have read and write access to the cluster shared volume. For example, as shown, VM 410a, VM 410b, VM 420a, VM 420c, and VM 430b each have read and write access to CSV 196a. One or more applications running on the VMs may be associated with frequently scheduled agent-based backup operations. Therefore, in one embodiment, during a volume-level backup operation as described in method 300 of FIG. 3, controlling node 122a may communicate with the Hyper-V writer to identify data subset 230 shown in FIG. 2. Alternatively, in an embodiment involving SQL databases, communication with an SQL writer(s) may be performed indirectly through VSS. Other embodiments may accomplish such communication in a variety of ways. Controlling node 122a may send queries to nodes 122b and 122c to determine corresponding write-protected data subsets. In response to receiving this query, node 122b may communicate with VM 420a and VM 420c to provide a response including at least identification of data subset 240 shown in FIG. 2. Similarly, node 122c may communicate with VM 430b to provide a response to controlling node 122a including at least identification of data subset 250 shown in FIG. 2. Cluster 120b may also comprise one or more VMs and perform similar operations as described for cluster 120a.

Figure 5:
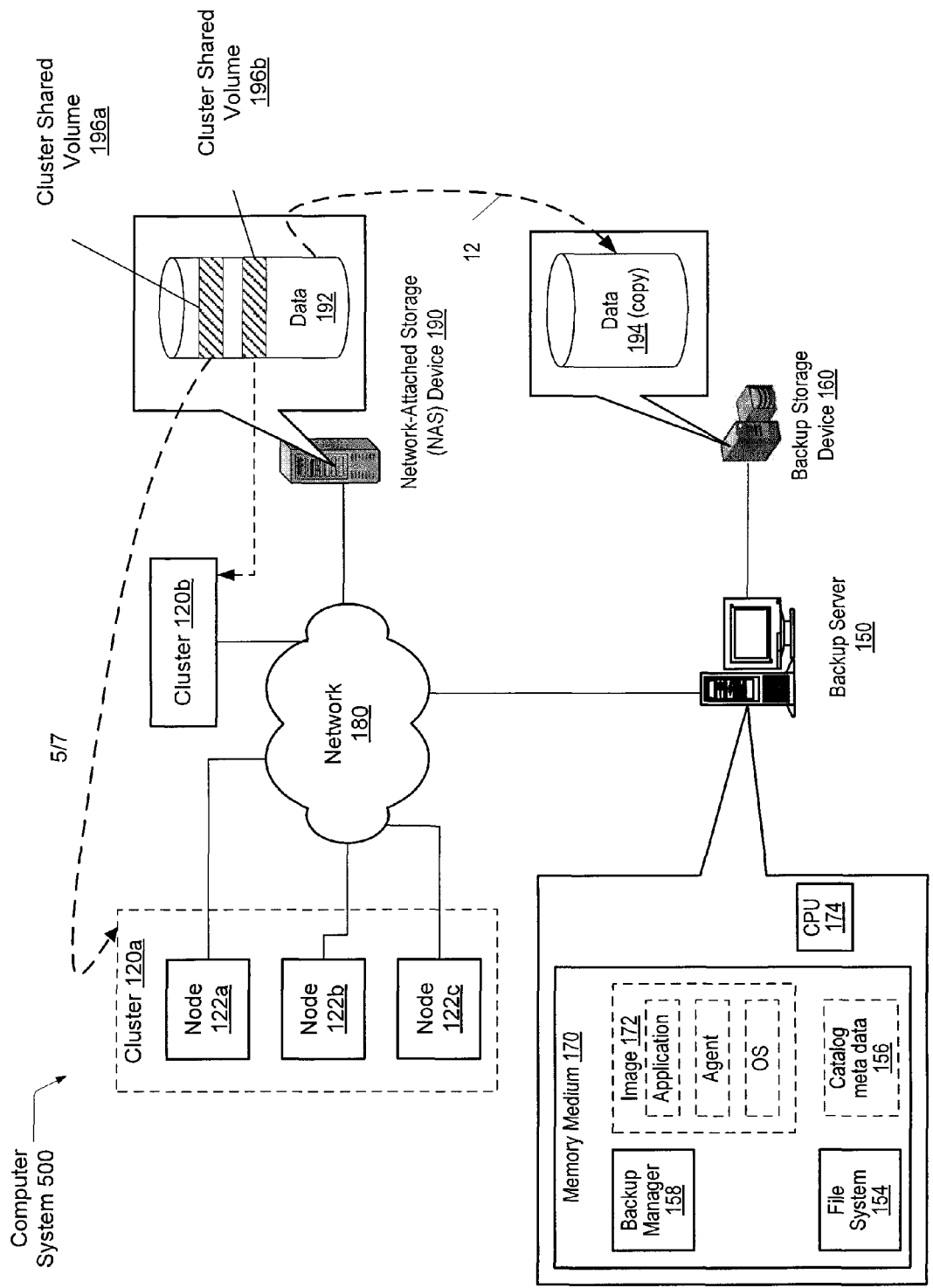
FIG. 5 illustrates one embodiment of a computer system.

Referring to FIG. 5, a generalized block diagram of one embodiment of a computer system 500 is shown. The same system components used in cluster shared storage 100 of FIG. 1 are numbered identically. As shown, system 500 includes clusters 120a and 120b interconnected through a network 180 to one another, to a Network-Attached Storage (NAS) device 170 and to a backup server 150. Disk storage 160 is coupled to backup server 150. Network 180 may include a variety of techniques including wireless connection, direct local area network (LAN) connections, wide area network (WAN) connections such as the Internet, a router, and others. Network 180 may comprise one or more LANs that may also be wireless. Network 180 may further include remote direct memory access (RDMA) hardware and/or software, transmission control protocol/internet protocol (TCP/IP) hardware and/or software, router, repeaters, switches, grids, and/or others.

In alternative embodiments, the number and type of clusters, servers, and storage devices is not limited to those shown in FIG. 5. Almost any number and combination of servers, desktop, nodes, and mobile clients may be interconnected in system 500 via various combinations of modem banks, direct LAN connections, wireless connections, WAN links, etc. Also, at various times one or more clusters and nodes may operate offline. In addition, during operation, individual client connection types may change as mobile users travel from place to place connecting, disconnecting, and reconnecting to system 500.

In one embodiment of computing system 500, nodes 122a-122c are representative of any number of stationary or mobile computers such as desktop PCs, workstations, laptops, handheld computers, blade servers, etc. The data that holds the information used and produced by applications executed on nodes 122a-122c and stored for later use may be referred to as a computer file, or file. Computer files may include photographic or other still images, documents, video streams, audio files, plain text files, or any other kind of data. In some embodiments the nodes 122a-122c may include an operating environment, e.g. an operating system. Alternatively, as previously discussed, the nodes 122a-122c may comprise one or more VMs operating with hypervisor technology. Symantec Corp., VMWare, Inc., Microsoft Corp., and others may provide virtualization platform software. Each virtual machine may maintain its own set of files, similarly as a physical computer would, such as operating system files, application program files, data files, etc. Whereas the files of a physical computer are typically stored on a hard disk, the files of each virtual machine may be stored in one or more virtual disk image files. A virtual disk image file may be formatted according to a particular specification. Virtual disk image file specifications in common use include at least the Virtual Hard Disk (VHD) format, the V2I format, and the Virtual Machine Disk Format (VMDK) format.

In addition to including software applications, each node may contain backup system agent software. The backup system agent may be software configured to assist a backup manager, such as the backup manager 158 on the backup server 150, to perform one or more backup functions. In some embodiments the backup system agent may also be configured to perform one or more backup functions independently of a backup manager 158. Each VM may execute one or more applications. One or more of the applications executed on a node may have an associated frequently scheduled agent-based backup operation. For example, an IT administrator may setup a daily agent-based backup operation for data corresponding to one or more database applications.

In various embodiments a Network-Attached Storage (NAS) device 190 may be any kind of device configured to store data. The NAS device 190 may be a computer specialized for providing file storage services to clusters 120a and 120b. The operating system and other software on the NAS device 190 provide the functionality of file systems, and access to files, and the management of these functionalities. A NAS device 190 is typically not designed to perform general-purpose computing tasks other than file storage. The NAS device 190 may not have a keyboard or display, and is instead controlled and configured over the network 180, sometimes by accessing their network address from a web browser.

Continuing with a description of the NAS device 190, a general-purpose operating system is usually not needed on the NAS device 190. Rather, a stripped-down operating system with minimal functionality may be used instead. The NAS device 190 may include one or more hard disks, often arranged into logical, redundant storage containers or RAID arrays (redundant arrays of inexpensive/independent disks). The data 192 may be stored on one or more of the hard disks of the NAS device 190.

The NAS device 190 may provide data storage at the file system level. The NAS device 190 may use file-based protocols such as Network Technology File System (NTFS), SMB/CIFS (Server Message Block/Common Internet File System) (used with MS Windows systems), or AFP (used with Apple Macintosh Computers). In the example of FIG. 5, files on the NAS device 190 may be accessed through a Network File System (NTFS) interface included in network 180.

Turning now to the backup server 150 in computer system 500, the backup server 150 may include a backup application 158. This backup application 158, or "backup manager" may comprise program instructions stored on the memory 170 and executable by the processor 174 to perform one or more backup operations. Backup operations may include creating partial or full backups, e.g., on a computer system or from one computer system to another system; performing restore functions (e.g., partial or granular restore functions, or full restore functions) on a computer system or from one computer system to another computer system; backup operations may also include other operations.

As noted above, the backup system agent may assist the backup manager 158 on backup server 150. The backup manager 158 may be configured to create a volume image backup. In some embodiments, the backup manager 158 may receive user input directing the backup manager 158 to create a volume image backup of a specific system. In some embodiments, the backup manager 158 may create a volume image backup of a specific system automatically, e.g., the backup manager may be scheduled to perform regular backups of a specific system. As one example, the backup manager 158 might create a volume image backup of CSV 196a. During this operation, the volume data less the write-protected data subsets corresponding to nodes 122a-122c may actually be backed up rather than the full volume data. This operation may follow the steps described by method 300 in FIG. 3. As part of creating the volume image backup of CSV 196a, the backup manager 158 may also create catalog metadata 156 associated with the image.

The catalog metadata 156 created by the backup manager 158 during a backup operation may include metadata for the image. Metadata may include at least one or more of the following: a data name, data size, a fingerprint of the data, a batch number, as well as data type, version number, ownership, permissions, modification time, error code, etc. A batch number may be used to identify the particular backup operation in which an associated backup entry was created. Other forms of metadata and/or identifiers will be apparent to those of ordinary skill in the art. The catalog metadata 156 may be usable for restore browsing, e.g., at a later time. For example, the data layout of stored information in backup storage device 160 may be stored in the catalog 156.

In one embodiment, the backup server 150 comprises a file system 154 that operates as a special-purpose database for the storage, organization, manipulation, and retrieval of data. File system 154 may provide access to data by operating as clients for a network protocol. Alternatively, file system 154 may be virtual and exist only as an access method for virtual data. A user may browse the directories stored on backup storage device 160 via the file system 154.

Returning to a data backup operation, in one embodiment, the backup manager 158 on backup server 150 may create the volume image backup and store it on the backup storage device 160. In another embodiment, the backup manager 158 may store the volume image backup on the backup server 150, e.g., on a memory 170 of the backup server 150, as shown. In yet other embodiments, the backup manager 158 may instead store the volume image backup on another device, e.g., on another computer system (such as another server) connected over the network 180. In any of the embodiments, a backup copy 194 of the data 192 may be subsequently restored to the NAS device 190 (or to another computer system) in the event that it becomes necessary to do so. Recovery of the backup copy 194, such as a volume image backup file, may have a variety of uses. For example, it may be used during system deployment for the setup of many computers. Another use may include data recovery. The image-level backup file may allow rapid restoration of a system after data loss caused by an operating system crash, a virus attack, hardware failure, or otherwise.

In addition to the above, the backup copy 194 may allow for a bare metal recovery, wherein the backed up data is available in a form that allows for a computer system restoration from "bare metal", or without any requirements of a previously installed software or operating system. In such a case, the backed up data typically includes the necessary operating system, applications, and data components to rebuild the backed up system to an entirely separate platform. During deployment, recovery, or other use of the backup data, if only certain files are needed, then it is possible to connect the image backup file as a virtual disk and then copy only the needed files from the image backup file using a file utility software program.

It is noted that the backup copy 194 may not be formatted in a similar manner as the original copy of the data 192. The many available backup products may each use a commonly known file format or alternatively a proprietary file format for the storage of data. In one embodiment, the volume image backup file discussed above may contain the complete contents and structure representing a storage medium, such as data 192 on NAS device 190. This volume image backup file may be created by performing a complete sector-by-sector, or alternatively, a byte-by-byte, copy of the data on storage mediums within NAS device 190. This copy thereby replicates the structure and contents of this data.

A volume image backup file may contain all files and may replicate all data once the initial volume-level backup operation completes and the subsequent agent-based backup operations complete as shown in FIG. 2. In another embodiment, a backup system only backs up user files. The backup system may not backup boot information. Similarly, some disk imaging utilities omit unused file space from source media, or compress the disk they represent to reduce storage requirements. The resulting files are typically referred to as archive files, as they are not literally disk images. Therefore, data in backup storage device 160 may not be "portable", or may not be easily copied to alternative locations for various purposes. Regardless of the type of backup file, this file may be stored on backup storage device 160. Although, the above descriptions refer to a volume image backup file, the methods and systems described herein may be used with any type of backup file or any type of data file.

In an embodiment where the backup manager 158 creates the volume image backup and stores it on the backup storage device 160, the backup storage device 160 may include or be further coupled to storage consisting of one or more hard disks, tape drives, server blades, or specialized devices, and may include a variety of memory devices such as RAM, Flash RAM, MEMS (MicroElectroMechanical Systems) storage, battery-backed RAM, and/or non-volatile RAM (NVRAM), etc. The backup manager 158 may create and store the volume image backup in a commonly known file format, such as VHD, VMDK, V2I, or otherwise. Alternatively, the backup manager 158 may create and store the volume image backup in a proprietary file format.

Figure 6:
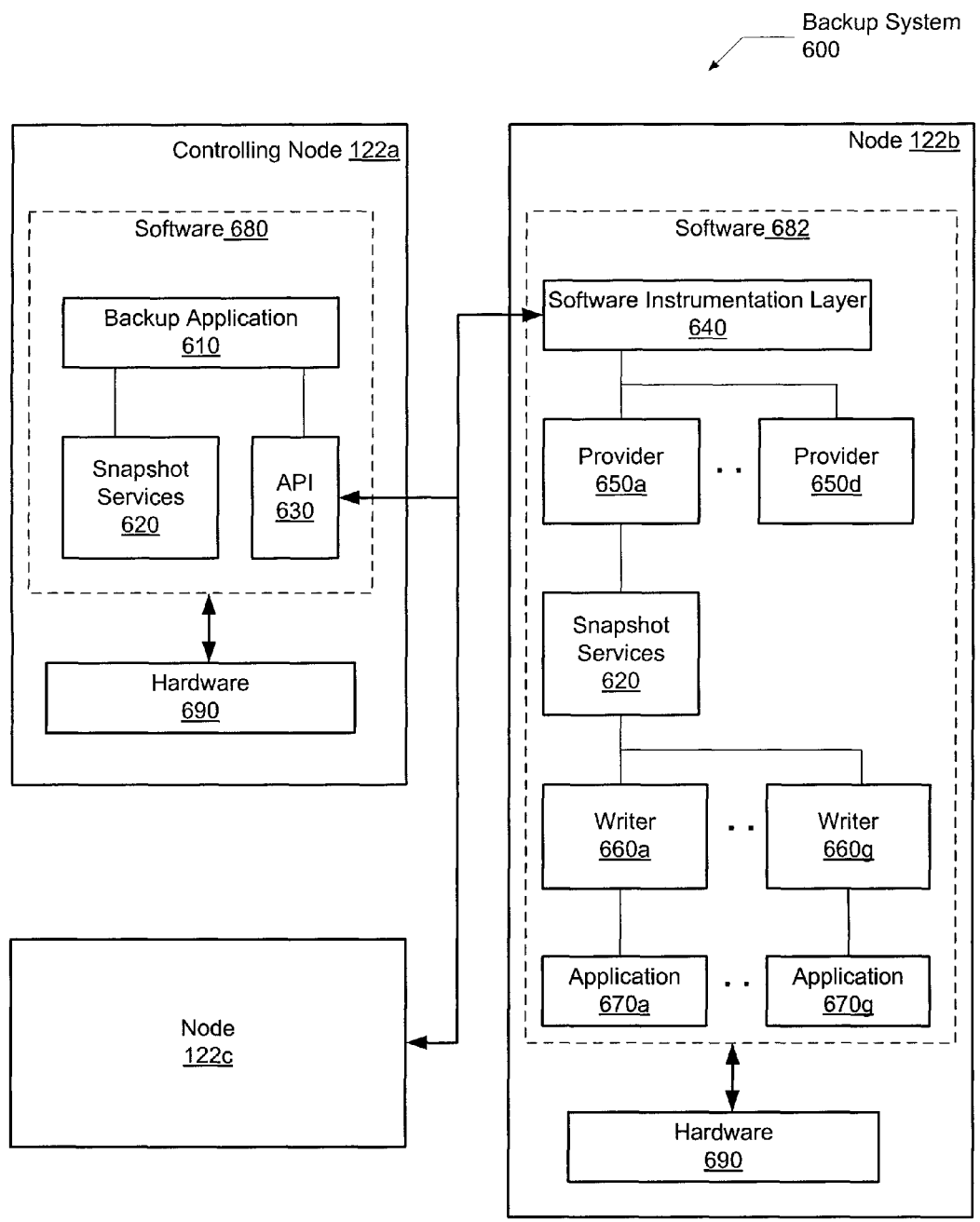
FIG. 6 illustrates one embodiment of a backup system.

Turning now to FIG. 6, a generalized block diagram of one embodiment of a backup system 600 within a node is shown. The same system components used in cluster shared storage 100 of FIG. 1 are numbered identically. Each node 122a, 122b, and 122c comprises hardware 690. As described earlier, typical computer hardware, which may be included in hardware 690, comprises one or more processors, each with one or more processing cores, a memory hierarchy with different levels of caches, logic for system bus management or packet processing, interfaces for peripherals, and so forth. Although cluster 122a is shown to have software 680 and cluster 122b is shown to have software 682, each of the nodes 122a, 122b, and 122c may have a copy of both software 680 and 682. Software 680 may comprise a backup application 610. Backup application 610 may be a remote backup application that communicates with a backup manager. In one embodiment, a backup job initiated by a backup manager targets a virtual cluster name. Each cluster may have a unique virtual cluster name that represents it on the network. Nodes within a cluster may be added and removed, but the corresponding virtual cluster name may remain the same.

In various embodiments, one of the cluster nodes may be selected to be a host for a corresponding virtual cluster. In one embodiment, the backup manager may attempt to connect with the virtual cluster name via the host. For example, if node 122a is selected to be the host of the cluster, then the backup manager 158 may attempt to connect with it. One of the cluster nodes may be selected to be a controlling node for a corresponding cluster. In one embodiment, a same node may have the responsibilities of both the host and the controlling node for the cluster. In another embodiment, separate nodes may have the responsibilities of the host and the controlling node.

If a controlling node fails for any reason, then another node within the cluster may be chosen to be the controlling node. The backup manager 158 or another application may be used to reassign the responsibilities of the host and the controlling node within the cluster. As described earlier, a shadow copy service may be provided by the operating system. This service may be used to provide the ability to capture a point in time state of a disk or a volume. In addition, when backing up a volume, such as cluster shared volume 196a, customers may elect to use an initial volume-level backup followed by an agent-based backup. The volume-level backup operation may utilize a shadow copy service provide by the operating system to manage the steps of the backup operation. One example of such a service is the Volume Shadow Copy Service (VSS) included in the Microsoft Windows® operating system. Snapshot services 620 represent an example of such a service.

An application programmer's interface (API) may allow each node to communicate with other nodes within the cluster and may allow system administrators and developers to write enterprise management applications. In various embodiments, the API may adhere to a standard. One example of such a standard includes the Microsoft Windows Management Instrumentation (WMI) Component Object Model (COM). WMI provides access to information that may also be available by other means via the operating system. For example, the name of the computer may be looked up in a registry, or an amount of free disk space on a drive may be determined. In some cases it may be difficult to retrieve desired information, especially if scripts or other programs are being developed in different programming languages. WMI may allow a system administrator or a developer to retrieve system information using a standardized approach such as an object model. In some cases, database-like queries, such as SQL-like queries, may be used to obtain information. The WMI COM standard may determine how object implementers and interfaces handle tasks such as memory management, parameter management, and multithreading. By conforming to COM, a COM API for WMI written by a developer may ensure that the API supports the functionality provided by the interfaces of each WMI object. Each WMI object generally includes several properties containing system information.

Software 682 shown in cluster 122b may include a software instrumentation layer 640. Layer 640 may provide a common interface and object model to access management information about operating systems, devices, applications, and services. In one embodiment, layer 640 may comprise a WMI Core component that contains the Windows Management Instrumentation (WMI) service. The providers 650a-650d shown in FIG. 6 may include operating system providers such as Microsoft WMI providers. Native OS products or third-party company software may install the providers 650a-650d. In various embodiments, providers 650a-650d may be used to provide data to the software instrumentation layer 640 and manage applications. For example, when the backup application 610 in cluster 122a receives a volume-level backup request from backup manager 158, the application 610 may send a query to a provider within itself. The query may request information regarding particular (e.g., all write-protected) data associated with cluster 122a. The identification of this write-protected data may allow the volume-level backup operation to exclude the write-protected data. Therefore, during a subsequent agent-based backup of the write-protected data, no duplicate copies will have been stored in the volume backup image file. The API 630 may be used to send a similar query to each of the other nodes within the cluster. The layer 640 may receive this request and determine the request should be conveyed to a particular provider such as provider 650a. Provider 650a may interpret the request and begin a process to retrieve the identification of all write-protected data associated with the corresponding node. For example, a given writer 660a may provide information regarding SQL data stored in the shared volume that is utilized by the given node, while another writer 660g may provide information regarding Microsoft® Exchange® data utilized by the node. In one embodiment, a writer represents code configured to handle interaction between a snapshot service (e.g., VSS) and a particular application (e.g., SQL server). For example, an SQL writer may be configured to communicate with an SQL server, VSS, and a requestor of a snapshot service (e.g., a backup application). In many cases a writer that corresponds to an application may be supplied by the vendor of the application.

The provider 650a, which received a query from the layer 640, may interface with the snapshot services 620 on the corresponding node. The provider 650a may convey a request via services 620 to each qualifying application of the applications 670a-670g on the corresponding node. A qualifying application may be an application associated with a predetermined agent-based backup operation. In some embodiments, a query conveyed from the node initiating a volume backup may identify such an application. In other embodiments, a node receiving the query may be configured to provide such information for one or more particular applications and the initiating node may receive an identification of all of the application specific data. For example, a database application is an example of a qualifying application. In one embodiment, each qualifying application may have its own writer 660a-660g. Each writer may be application-specific software that ensures the application data is ready for a shadow copy creation. For example, a writer for a given application may temporarily halt I/O to a volume which is to be backed up. In some embodiments, I/O transactions may be queued while the backup operation is in progress and resumed at a later time.

In one embodiment, a writer may be configured to identify application-specific data and provide such an identification to the provider 650a. For example, as discussed above, writers may be application specific themselves and are configured to identify data used by the corresponding application. In one embodiment, the writer obtains metadata corresponding to the application associated with the write software. This metadata may include identification, such as addresses or other location identifiers, of the corresponding data. In one embodiment, the metadata is in an XML format, though any suitable format may be utilized. In various embodiments, the information provided (e.g., metadata) may include a list of virtual machines and files or directories that are used by those virtual machines. In one embodiment, a writer on a node may only be aware of data in a cluster shared volume that is utilized by that node. Therefore, in various embodiment, in order to discover other particular files corresponding to a given application that are stored in the shared volume, queries are sent to the other nodes to obtain metadata from each cluster node.

The order in which the provider 650a receives corresponding identifying information from the writers 660a-660g may be different from the order in which the provider sent requests to the writers 660a-660g. Additionally, each communication from a provider 650a to a particular writer may comprise a separate command. In one embodiment, when the provider 650a determines it has received all responses, the provider 650a may package the responses according to a predetermined format. One example of a predetermined format is a WMI Object. Then the provider 650a sends the packaged metadata including identification of particular data (e.g., write-protected files) to layer 640. Layer 640 then sends the packaged responses to the controlling node within the cluster. The backup application 610 may then combine the received responses with its own identification of write-protected data. Alternatively, the backup application 610 may inspect the received responses separately from its own identifications. The backup application 610 inspects the received responses from all nodes and determines whether or not an object corresponds to a predetermined excluded type (database, directories, folders). If the corresponding object does correspond to a predetermined excluding type, then the backup application 610 may determine from the object the corresponding location(s) of the data to be excluded.

Subsequently, the backup application 610 may perform a walk-through on the corresponding CSV and back up the locations that are not excluded. At the end of the backup operation, the backup application 610 may continue with the read and write transactions stored in the controlling node 122a and re-enable read/write access to the shared volume. As described earlier, Direct I/O is a read/write access feature of a file system whereby file read and write transactions bypass the operating system read and write caches. In one embodiment, the Direct I/O may have been turned off by a command or message from the backup manager 158 prior to sending a volume-level backup request. In another embodiment, the controlling node within the cluster may turn off the Direct I/O feature after receiving the volume-level backup request and prior to sending queries to determine the identification of write-protected data. At a later time after the Direct I/O feature is reinstated, one or more other backup operations, such as an agent-based backup operations, back up the previously excluded files to the backed up volume image file.

Briefly returning to the provider 650a, in one embodiment this software may support two types of snapshot procedures. In one procedure, a method implements mirror volumes where two or more mirrored disks are kept in sync. During a snapshot operation, one mirror may be disconnected. The mirror in this case contains a full copy of data. One drawback is storage capacity increases to accommodate the extra copy. The snapshot may be safely deleted once all files are backed up from the snapshot. The mirror volume may subsequently be moved back to the storage device and resynced with the live volume. This step may also reactive Direct I/O. A second procedure utilizes a copy-on-write snapshot method. When the copy-on-write snapshot is first created, only meta-data regarding the location of the original data is copied. No physical copy of data is done at the time of the snapshot making it a very quick operation. The snapshot copy then tracks the changing blocks on the original volume. When any of the blocks is about to be changed, its original copy is moved to a set-aside storage pool before the original data is overwritten. A benefit is speed. A drawback is an access to both the snapshot and the original volume is used in order to backup data from the snapshot.

Figure 7:
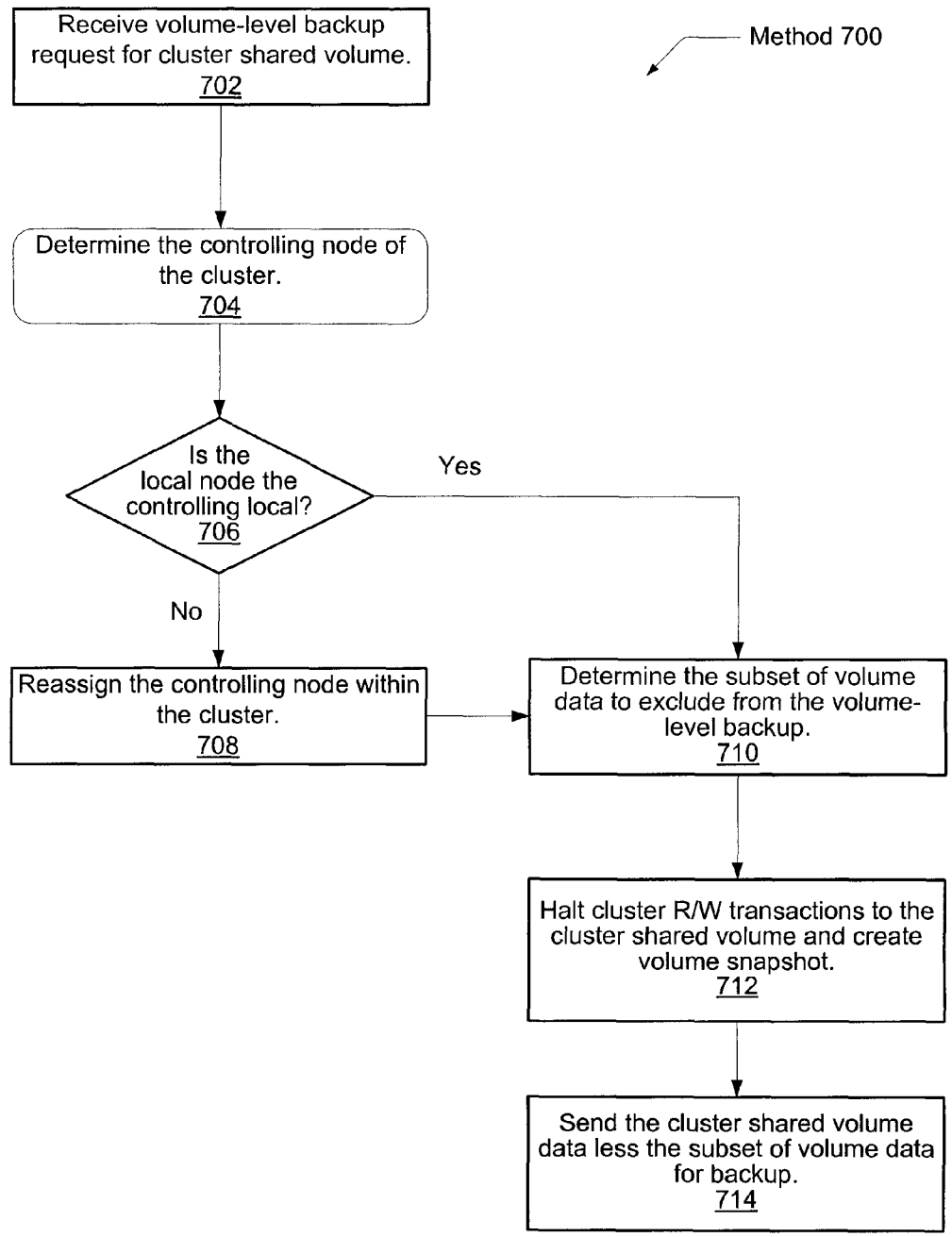
FIG. 7 illustrates one embodiment of a flow diagram illustrating one embodiment of a method for avoiding duplicate copies in a volume-level backup operation.

Turning now to FIG. 7, one embodiment of a method 700 for avoiding duplicate copies in a volume-level backup operation is shown. Similar to method 300, the components embodied in the computer system described above may generally operate in accordance with method 700. For purposes of discussion, the steps in this embodiment are shown in sequential order. However, some steps may occur in a different order than shown, some steps may be performed concurrently, some steps may be combined with other steps, and some steps may be absent in another embodiment.

In block 702, a node may receive a volume-level backup request. In block 704, a backup manager may determine the controlling node of a particular cluster. In one embodiment, the backup manager may communicate with a predetermined hosting node within the cluster to obtain identification of the controlling node. In another embodiment, the backup manager may access a previously stored record or table. If the controlling node is not local (conditional block 706), then in block 708, the local node is assigned as the new controlling node. In block 708, read and write transactions to the CSV may be halted. In block 710, data within the cluster to be excluded from the volume-level backup may be identified. For example, queries may be sent from the controlling node to the other nodes within the cluster as described earlier regarding backup system 600 in FIG. 6. In block 712, transactions to the cluster shared volume may be temporarily halted and the volume snapshot created. Finally, in block 714, the cluster shared volume data less the subset of volume data identified by the queries is sent to a backup storage medium for backup. As noted above, method steps described herein may occur in a different order than shown, some steps may be performed concurrently, some steps may be combined with other steps, and some steps may be absent in various embodiments. For example, controlling node discovery and transfer could be done between blocks 712 and 714 along with temporarily halting R/W transactions while the snapshot is being created.

It is further noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

In various embodiments, one or more portions of the methods and mechanisms described herein may form part of a cloud computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for use in a computing system, the method comprising:
   initiating backup of a shared volume to a backup server by a first node in a computing system, the shared volume being shared by the first node and a second node of the computing system and comprising first data stored in a data storage medium;
   in response to initiating the backup, conveying from the first node to the second node a query for information identifying a subset of the first data that the second node is configured to backup from the shared volume to the backup server;
   the second node conveying a response to the query, the response comprising information that identifies the subset of the first data that the second node is configured to backup from the shared volume to the backup server; and
   the first node completing backup of the shared volume to the backup server, the backup including the first data and excluding the subset of the first data.

2. The method as recited in claim 1, wherein said volume is a cluster shared volume for a given cluster, and both the first node and the second node are part of the given cluster.

3. The method as recited in claim 2, wherein each of the first node and the second node comprises a snapshot service for use in creating a copy of data stored in the shared volume.

4. The method as recited in claim 1, wherein the subset of the first data is write-protected data.

5. The method as recited in claim 3, wherein the subset of first data represents data stored in the shared volume that is used by the second node, and wherein the method further comprises utilizing an application-specific writer in the second node that corresponds to both the snapshot service and the application in order to identify the subset of the first data.

6. The method as recited in claim 5, wherein the method further comprises the second node:
   sending one or more commands to the application-specific writer within the second node;

receiving corresponding responses to said one or more commands; and packaging the responses according to predefined format for inclusion in the response to the query.

7. The method as recited in claim 4, further comprising temporarily halting non-backup related read/write accesses to the shared volume during backup of the shared volume.

8. The method as recited in claim 7, wherein said halting of read/write accesses is performed by one or more application-specific writers.

9. A computer system comprising:
a first node;
a second node; and
a data storage medium coupled to the first node and the second node, wherein the data storage medium is configured to store first data corresponding to a shared volume which is shared by the first node and the second node;
wherein the first node is configured to:
initiate backup of the shared volume to a backup server;
in response to initiating the backup, convey from the first node to the second node a query for information identifying a subset of the first data that the second node is configured to backup from the shared volume to the backup server;
wherein the second node is configured to:
receive the query from the first node; and
convey a response to the query, the response comprising information that identifies the subset of the first data that the second node is configured to backup from the shared volume to the backup server; and
wherein the first node is configured to receive the response and complete the backup of the shared volume to the backup server, the backup comprising the first data excluding the subset of the first data.

10. The computer system of claim 9, wherein said volume is a cluster shared volume for a given cluster, and both the first node and the second node are part of the given cluster.

11. The computer system of claim 10, wherein each of the first node and the second node comprises a snapshot service for use in creating a copy of data stored in the shared volume.

12. The computer system of claim 9, wherein the subset of the first data is write-protected data.

13. The computer system of claim 11, wherein the subset of first data represents data stored in the shared volume that is used by the second node, and wherein the second node is configured to utilize an application-specific writer that corresponds to both the snapshot service and the application in order to identify the subset of the first data.

14. The computer system of claim 13, wherein the second node is further configured to:
send one or more commands to the application-specific writer within the second node;
receive corresponding responses to said one or more commands; and
package the responses according to predefined format for inclusion in the response to the query.

15. The computer system of claim 12, wherein the first node and the second node are configured to temporarily halt non-backup related read/write accesses to the volume during backup of the shared volume.

16. The computer system of claim 15, wherein said halting of read/write accesses is performed by one or more application-specific writers.

17. A non-transitory computer-readable storage medium storing program instructions that are executable by one or more processors to:
initiate backup of a shared volume to a backup server by a first node in a computing system, the shared volume being shared by the first node and a second node of the computing system and comprising first data stored in a data storage medium;
in response to initiating the backup, convey from the first node to the second node a query for information identifying a subset of the first data that the second node is configured to backup from the shared volume to the backup server;
cause the second node to convey a response to the query, the response comprising information that identifies the subset of the first data that the second node is configured to backup from the shared volume to the backup server; and
cause the first node to complete backup of the shared volume to the backup server, the backup including the first data and excluding the subset of the first data.

18. The non-transitory computer-readable storage medium of claim 17, wherein said volume is a cluster shared volume for a given cluster, and both the first node and the second node are part of the given cluster.

19. The non-transitory computer-readable storage medium of claim 18, wherein each of the first node and the second node comprises a snapshot service for use in creating a copy of data stored in the shared volume.

20. The non-transitory computer-readable storage medium of claim 17, wherein the subset of the first data is write-protected data.

* * * * *